16 UNITED STATES PATENT OFFICE.

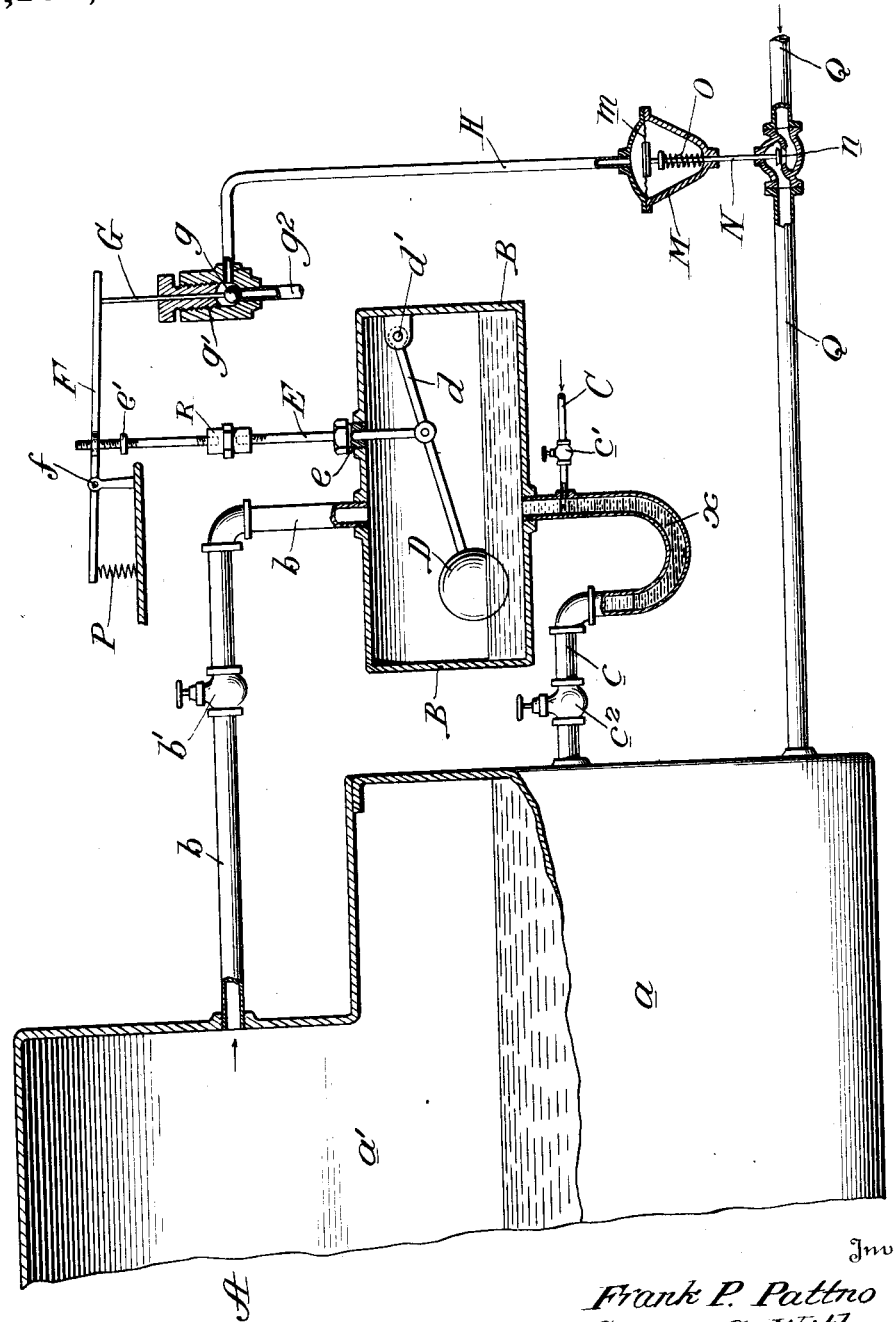

FRANK P. PATTNO AND GEORGE S. WITHAM, JR., OF AU SABLE FORKS, NEW YORK.

EVAPORATOR.

1,196,020.

Specification of Letters Patent. Patented Aug. 29, 1916.

Application filed November 29, 1915. Serial No. 64,070.

*To all whom it may concern:*

Be it known that we, FRANK P. PATTNO and GEORGE S. WITHAM, Jr., residing at Au Sable Forks, in the county of Essex and State of New York, both citizens of the United States of America, have invented certain new and useful Improvements in Evaporators, of which the following is a specification.

10. This invention relates especially to evaporators of the kind usually employed in the manufacture of sugar or the like, or in the concentration of similar materials, and consists in improved means for controlling the flow of the liquor to the evaporator or from one evaporating vessel to another.

Ordinarily, as is well understood, in the manufacture of sugar, for instance, a series of evaporating vessels is employed, known as a "multiple effect" in which the liquor is concentrated. Steam from one vessel where the liquid boils under a pressure somewhat less than atmospheric is employed to heat the liquid in the next vessel boiling under still less pressure. Each of the evaporating vessels in such systems is provided with steam chambers and other equipments, but provision is made for the disengagement of the vapors. The upper part or vapor chamber of each evaporating vessel is connected with the steam space of the next vessel so that the vapors from the boiling liquid may pass into the steam chamber of the next succeeding vessel, and so on.

Heretofore the pipes leading to the liquor spaces of the various vessels were equipped with hand-operated valves to enable the attendant to govern the flow of liquor, and as is usually the case in hand regulation the liquid in the vessels was allowed to attain various levels, and the best results were not obtained because, as is well known, the most effective work is done when the liquid is at an ascertained level.

The principal object of this invention is to maintain the liquid at the proper level in the evaporating vessel or vessels by automatically controlling the flow of liquor thereto, and this we accomplish by the use of a valve controlled by a float contained in a chamber communicating with the evaporating vessel and in which the liquid level corresponds with the liquid level in the evaporating vessel.

In the apparatus to which our improvements are applied the surge of the liquid is such that a float valve will not operate properly if placed directly in the vessel or unless some means be provided for preventing such surging from operating on the float; and furthermore if the liquid, which is sticky and gummy, comes in contact with, or is deposited on, the float or its equipments the operation of the float is rendered irregular or is stopped, thus rendering it necessary to shut down the apparatus until the parts are cleaned or repaired. In order to overcome this, we interpose between the evaporating vessel and the float chamber a pipe containing a suitable liquid, such as mercury, oil or the like, which serves to prevent the surging of the liquid from affecting the float and also to prevent a sticky or gummy liquid from coming in contact with the float mechanism.

Instead of connecting the float directly with the liquor-controlling valve or pump we cause the float to operate a valve which controls a motive fluid, which in turn controls the supply of liquor. In this way the liquid level in the evaporator may be controlled by a valve or pump located at any desired distance from the evaporating apparatus.

The accompanying drawing, which is partly in section and partly in elevation, shows diagrammatically apparatus embodying our improvements.

A indicates one of the evaporating vessels or pans usually employed, $a$ being the liquid space and $a'$ the vapor space.

B indicates a float chamber the upper portion of which is connected with the vapor space $a'$ by a pipe $b$ provided with a hand valve $b'$. The lower part of the float chamber is connected with the liquid space $a$ of the vessel A by a pipe $c$ equipped with a hand valve $c^2$ and this pipe is bent, as shown, and contains a sealing liquid $x$, which may be oil, mercury or the like. The sealing liquid may be supplied and maintained through a pipe C equipped with a hand valve $c'$. The chamber B may contain any suitable liquid and this chamber may be of any suitable shape and size and really forms part of a column connecting the water space of the evaporating vessel with the vapor space thereof.

It is obvious that the float may be made to directly operate a liquor-controlling valve but in such case we have found that the control is not sufficiently delicate and furthermore the valve is necessarily located near the float. We therefore cause the float to operate a valve which controls a motive fluid, in turn operating the valve of the liquor-feed pipe or the device which supplies liquor to the evaporator. The arm $d$ of the float D is pivoted at $d'$ of the walls of the chamber B and it is pivotally connected with a rod E extending through a packing gland $e$ and connected to a lever F, pivotally supported at $f$ and connected at one end to a rod G adapted to operate on a ball valve $g$ in a valve chamber $g'$ to which a motive fluid, such as air, steam or the like is admitted at $g^2$. The valve chamber $g'$ is connected by means of a pipe H with a chamber M, containing a diaphragm $m$ to which is connected a valve stem N controlling a valve $n$ in the liquor supply pipe Q. The valve $n$ is opened by a spring O pressing on the diaphragm but when pressure is applied to the diaphragm in opposition to the spring the valve is closed. The valve $g$ is normally closed and the valve $n$ is normally open. The spring P, acting on the lever F, operates to hold the valve $g$ closed. But when the supply of liquor is greater than required the liquid level rises, the float D also rises, and by means of the adjustable nut $e'$ lifts the lever F and allows the valve $g$ to open, thus admitting the motive fluid which, acting on the diaphragm $m$, closes the valve $n$ and suspends the feed of liquor to the evaporator. The nut $e'$ may be so adjusted as to operate upon the lever F at the desired time. The length of the rod E may be adjusted by means of the adjusting nut R and in this way the relative position of the float to the controlling apparatus may be varied, thus enabling the attendant or operator to maintain the liquid level best suited to the various units in the system without any adjustments within the float chamber.

In the organization of the apparatus as illustrated it will be observed that the valve $n$ is normally open so that the supply or transfer of the liquid may be continuous, but should the supply of liquor be too fast the mechanism before described operates to close the valve $n$ and suspend the supply of liquor. The amount of liquor supplied under normal conditions may be regulated by suitable adjustments of the valve mechanism. If necessary at any time the float chamber may be entirely disconnected from evaporator by means of the hand valves $b'$, $c^2$, and these valves may be opened or closed to any required extent.

It will be observed that the float chamber is connected with both the vapor space and the liquor space of the evaporator and the pressures are thus properly equalized or balanced in the two chambers although the liquid level in the float chamber may not necessarily be in line with the liquid level in the evaporator because when the relations of the liquid levels are known the valve mechanism may be suitably adjusted to accommodate the relative liquid levels.

We claim as our invention:—

1. The combination with an evaporating vessel of a float chamber connected therewith, a float in said chamber, a liquor supply for the evaporator controlled by said float, and a liquid seal interposed between the float chamber and the evaporator for preventing liquor from the evaporating vessel from passing to the float chamber.

2. The combination with an evaporator of a closed float chamber connected therewith, above and below the liquid level therein, a liquor supply for the evaporator, means operated by the float for controlling said supply, a liquid seal in the connection between the evaporator and the float chamber for preventing liquid from the evaporating vessel from passing to the float chamber, and means for maintaining the liquid seal.

3. The combination with an evaporator of a float chamber connected with the liquid space and the vapor space thereof, a mercury seal in the connection between the float chamber and the liquid space of the evaporator, a liquor supply for the evaporator, and valve mechanism operated by the float for controlling the liquor supply.

4. The combination with an evaporator of a float chamber connected therewith, a float in said chamber, a liquid supply for said evaporator, a fluid operated valve controlling said supply, a pipe for conveying to said fluid-operated valve a motive fluid the pressure of which is unaffected by variations in pressure in the evaporator, and a valve operated by the float for controlling the flow of said motive fluid.

5. The combination with an evaporator of a float chamber connected therewith, a float in said chamber, a liquid supply for said evaporator, a fluid operated valve controlling said supply, a pipe for conveying to said fluid-operated valve a motive fluid the pressure of which is unaffected by variations in pressure in the evaporator, a valve operated by the float for controlling the flow of said motive fluid, and means for adjusting the connections between the float and said last mentioned valve.

6. The combination with a vessel in which a liquid is boiled, a float chamber connected with said vessel, a fluid seal interposed in said connection for preventing liquid from said vessel from passing to the float chamber, a pipe for supplying liquid to said vessel, a float in the float chamber, fluid operated means for controlling the supply of liquid through said pipe, a pipe for conveying a motive fluid unaffected by variations in pressure in said vessel to said fluid-operated means, and devices operated by the float for controlling said motive fluid.

In testimony whereof, we have hereunto subscribed our names.

FRANK P. PATTNO.
GEORGE S. WITHAM, Jr.

Witnesses:
LESLIE J. L. AVERY,
RICHARD L. TRUMBULL.